(12) United States Patent
    Khan

(10) Patent No.: US 9,611,036 B1
(45) Date of Patent: **\*Apr. 4, 2017**

(54) ROTOR-MAST-TILTING APPARATUS AND METHOD FOR LOWER FLAPPING LOADS

(71) Applicant: GROEN BROTHERS AVIATION, INC., Salt Lake City, UT (US)

(72) Inventor: Jehan Zeb Khan, Savoy, IL (US)

(73) Assignee: Groen Aeronautics Corporation, Salt Lake City, UT (US)

( * ) Notice: Subject to any disclaimer, the term of this patent is extended or adjusted under 35 U.S.C. 154(b) by 88 days.

This patent is subject to a terminal disclaimer.

(21) Appl. No.: 14/544,796

(22) Filed: Feb. 18, 2015

Related U.S. Application Data

(62) Division of application No. 13/373,414, filed on Nov. 14, 2011, now Pat. No. 8,991,745.

(60) Provisional application No. 61/575,196, filed on Aug. 17, 2011.

(51) Int. Cl.
  *B64C 27/52* (2006.01)
  *B64C 27/02* (2006.01)
  *B64C 27/00* (2006.01)
  *G05D 19/00* (2006.01)

(52) U.S. Cl.
  CPC ............ *B64C 27/52* (2013.01); *B64C 27/001* (2013.01); *B64C 27/02* (2013.01); *G05D 19/00* (2013.01)

(58) Field of Classification Search
  CPC ........ B64C 27/001; B64C 27/52; G05D 19/00
  See application file for complete search history.

(56) References Cited

U.S. PATENT DOCUMENTS

| | | | |
|---|---|---|---|
| 1,947,901 A | 2/1934 | De la Cierva | |
| 2,352,342 A | 6/1944 | Pitcairn | |
| 2,601,463 A | 6/1952 | Stanley | |
| 3,649,132 A * | 3/1972 | Arcidiacono | ......... B64C 27/001 416/114 |
| 3,957,226 A | 5/1976 | Daggett, Jr. et al. | |
| 4,025,230 A * | 5/1977 | Kastan | ................. G05D 1/0858 244/17.13 |
| 4,099,671 A | 7/1978 | Leibach | |
| 4,200,252 A | 4/1980 | Logan et al. | |
| 5,209,430 A | 5/1993 | Wilson et al. | |
| 5,301,900 A | 4/1994 | Groen et al. | |

(Continued)

OTHER PUBLICATIONS

John Ballard et al., An Investigation of a Stoppable Helicopter Rotor with Circulation Control NASA, Aug. 1980.

(Continued)

*Primary Examiner* — Joseph W Sanderson
(74) *Attorney, Agent, or Firm* — The Watson I.P. Group, PLC; Jovan N. Jovanovic; Vladan M. Vasiljevic

(57) ABSTRACT

A method and apparatus for reducing flapping loads imposed on a rotor are disclosed. The method may include flying a rotorcraft comprising an airframe, a rotor, a mast extending to connect the rotor to the airframe, a tilt mechanism, at least one sensor, and a computer system. The computer system may obtain in real time, from the at least one sensor, data characterizing at least one flapping load experienced by the rotor during the flying. Using the data, the computer system may issue at least one command to the tilt mechanism. In response to the command, the tilt mechanism may reorient the mast with respect to the airframe. This reorienting may lower the flapping load experienced by the rotor.

20 Claims, 11 Drawing Sheets

(56) References Cited

U.S. PATENT DOCUMENTS

| | | | | |
|---|---|---|---|---|
| 5,850,615 | A * | 12/1998 | Osder | B64C 27/24 244/17.13 |
| 6,099,254 | A * | 8/2000 | Blaas | B64C 27/72 416/114 |
| 6,231,005 | B1 * | 5/2001 | Costes | B64C 27/605 244/17.25 |
| 6,280,141 | B1 | 8/2001 | Rampal et al. | |
| 6,352,220 | B1 | 3/2002 | Banks et al. | |
| 6,616,095 | B2 * | 9/2003 | Stamps | B64C 27/08 244/17.13 |
| 6,885,917 | B2 | 4/2005 | Osder et al. | |
| 7,137,591 | B2 * | 11/2006 | Carter | B64C 27/52 244/17.27 |
| 7,147,182 | B1 | 12/2006 | Flanigan | |
| 8,170,728 | B2 * | 5/2012 | Roesch | B64C 27/22 244/6 |
| 8,991,744 | B1 * | 3/2015 | Khan | B64C 27/52 244/17.11 |
| 8,991,745 | B1 * | 3/2015 | Khan | B64C 27/52 244/17.11 |
| 2002/0134883 | A1 * | 9/2002 | Stamps | B64C 27/08 244/7 R |
| 2004/0232280 | A1 * | 11/2004 | Carter | B64C 27/52 244/17.25 |

OTHER PUBLICATIONS

Fairey Aviation Company, The Fairey Rotodyne 40-44 Passenger Helicopter, England, May 1954.
Arthur W. Linden and James C. Biggers, X-Wing Potential for Navy Applications, estimated 1959.
Robert Sopher and James Duh, Prediction of Aeroelastic Response of a model X-Wing Rotor Sikorsky Aircraft Division, United Technologies, Feb. 19-21, 1986.
J.R. Ewans et al., Further Model Wind Tunnel Tests of a Reverse Velocity Rotor System, Fairchild Republic Company, Jul. 1975.
Fairey Aviation Limited, Fairey Rotodyne Design Z, Mar. 23, 1960.
Fairey Rotodyne Description and Drawings, estimated 1959.
Fairey Rotodyne Description Specifications, estimated 1959.
E. Wilde et al., The Flapping Behaviour of a Helicopter Rotor at High Tip-Speed Rations, Ministry of Aviation, London, 1966.
Michael G. Gilbert et al., The Effects of Aeroelastic Deformation on the Unaugmented Stopped-Rotor Dynamics of an X-Wing Aircraft, NASA, Jun. 1987.
D. N. Goldstein et al., Rotorcraft convertible Engine Study, Final Report, NASA Lewis Research Center, Aug. 1983.
G. Warren Hall et al., Flight Testing the Fixed-Wing Configuration of the Rotor Systems Research Aircraft, NASA, Jun. 1985.

Gerald J. Healy, X-Wing Noise Data Acquisition Program, NASA, Feb. 1983.
G.S. Hislop, The Fairey Rotodyne, A paper to be presented to a Joint Meeting of the Helicopter Association of Great Britain, Nov. 7, 1958.
S.L. Smith, Jet Research Report, Evaluation of Rotor Power and a Comparison With Predicted Performance, May 1, 1958.
K. T. Mckenzie, The Journal of The Helicopter Association of Great Britain, Aerodynamic Aspects of the Fairey Rotodyne, Dec. 1959.
M. Mosher, Acoustic Measurements of the X-Wing Rotor, NASA Technical Memorandum 94292, Ames Research Center, Moffett Field, CA, 1983.
David H. Hickey, NACA Research Memorandum, Full-Scale Wind-Tunnel Tests, National Advisory Committee for Aeronautics, May 17, 1956.
Watson H. Tanner, Charts for Estimating Rotary Wing Performance in Hover and at High Forward Speeds, NASA Contractor Report, Nov. 1964.
D.M. Martin et al, Experimental Investigation of Advance Hub and Pylon Fairing Configurations to Reduce Helicopter Drag, NASA Technical Memorandum 4540, Sep. 1993.
Franklin D. Harris et al., The XV-1's Rotor System, AHS International, Jan. 21-24, 2004.
A. Stepan, Journal of the Helicopter Association of Great Britain—vol. 13, No. 6, Dec. 1949.
A. Stepan, Journal of the Royal Aeronautical Society, London, Feb. 1958.
Fairey Rotodyne-Type 20Z 10W and Performance, Technical Publications, Project 79, Issue 2, Feb. 1959.
Fairey Aviation Company, Fairey Rotodyne, Weights and performance Index, estimated 1959.
Fairey Aviation Company, The Fairey Rotodyne 40-48 Passenger Helicopter, England, estimated 1959.
Fairey Aviation Company, The Fairey Rotodyne Design Certificate, estimated 1959.
Fairey Aviation Company, Tactical Mobility, Fairey Rotodyne for the Services, estimated 1959.
William Willshire, Rye Canyon X-Wing Noise Test: One-Third Octave Band Data, NASA Technical Memorandum, Jan. 1983.
Bruce D. Charles et al., Wind Tunnel Investigation of Semi rigid Full-Scale Rotors Operating a High Advance Ratios, U.S. Army Aviation Material Laboratories, Fort Eustis, Virginia, Jan. 1969.
Jessica Woods et al., Results of a Parametric Aeroelastic Stability Analysis of a Generic X-Wing Aircraft, NASA Technical Memorandum 101572, Apr. 1989.
Franlkin D. Harris et al., The XV-1's Rotor System, AHS International, Jan. 21-24, 2004.
S. Cohan et al., XV-9A Hot Cycle Research Aircraft Program Summary Report, U.S. Army Aviation Material Laboratories, Fort Eustis, Virginia, Jun. 1966.

* cited by examiner

ROTOR-MAST-TILTING APPARATUS AND METHOD FOR LOWER FLAPPING LOADS

RELATED APPLICATIONS

This application: is a divisional (continuation) of U.S. patent application Ser. No. 13/373,414, filed Nov. 14, 2011; which claims the benefit of U.S. Provisional Patent Application Ser. No. 61/575,196, filed Aug. 17, 2011; both of which are hereby incorporated by reference.

Additionally, this patent application hereby incorporates by reference U.S. Pat. No. 5,301,900 issued Apr. 12, 1994 to Groen et al., U.S. Pat. No. 1,947,901 issued Feb. 20, 1934 to J. De la Cierva, and U.S. Pat. No. 2,352,342 issued Jun. 27, 1944 to H. F. Pitcairn.

RIGHTS OF U.S. GOVERNMENT

This invention was made with Government support under Agreement No. HR0011-06-9-0002 awarded by DARPA. The Government has certain rights in the invention.

BACKGROUND

The Field of the Invention

This invention relates to rotating wing aircraft (rotorcraft), and, more particularly to rotorcraft relying on autorotation of a rotor to provide lift.

The Background Art

Rotorcraft rely on a rotating wing to provide lift. In contrast, fixed-wing aircraft rely on air flow over a fixed wing to provide lift. Fixed-wing aircraft must therefore achieve a minimum ground velocity on takeoff before the lift on the wing is sufficient to overcome the weight of the plane. Fixed-wing aircraft therefore generally require a long runway along which to accelerate to achieve this minimum velocity and takeoff.

In contrast, rotorcraft can take off and land vertically or along short runways inasmuch as powered rotation of the rotating wing provides the needed lift. This makes rotorcraft particularly useful for landing in urban locations or undeveloped areas without a proper runway.

The most common rotorcraft in use today are helicopters. A helicopter typically includes an airframe, housing an engine and passenger compartment, and a rotor, driven by the engine, to provide lift. Forced rotation of the rotor causes a reactive torque on the airframe. Accordingly, conventional helicopters require either two counter rotating rotors or a tail rotor in order to counteract this reactive torque.

Another type of rotorcraft is the autogyro. An autogyro aircraft derives lift from an unpowered, freely rotating rotor comprising two or more rotor blades. The energy to rotate the rotor results from a windmill-like effect of air passing through the underside of the rotor (i.e., autorotation of the rotor). The Bernoulli Effect of the airflow moving over the rotor blade surface creates lift. The forward movement of the aircraft comes in response to a thrusting engine such as a motor driven propeller mounted fore or aft.

During the early years of aviation, autogyro aircraft were proposed to avoid the problem of aircraft stalling in flight and to reduce the need for runways. In autogyro aircraft, the relative airspeed of the rotor blades may be controlled or influenced somewhat independent of the forward airspeed of the autogyro, allowing slow ground speed for takeoff and landing, and safety in slow-speed flight.

Various autogyro devices in the past have provided some means to begin rotation of the rotor prior to takeoff (i.e., prerotation). Prerotation may minimize the takeoff distance down a runway. One type of autogyro is the "gyrodyne." Examples of such aircraft are the XV-1 convertiplane tested in 1954 and the Rotodyne built by Fairey Aviation in 1962. The gyrodyne includes a thrust source providing thrust in a flight direction and a rotor providing autorotative lift at cruising speeds. Jet engines located on the tip of each rotor blade provided rotation of the rotor during takeoff, landing, and hovering.

Although typical rotorcraft provide the significant advantage of vertical takeoff and landing (VTOL), they are much more limited in their maximum flight speed than are fixed-wing aircraft. One reason that prior rotorcraft are unable to achieve high flight speed is a phenomenon known as "retreating blade stall."

In a fixed-wing aircraft, all wings move forward in fixed relation with respect to one another and the airframe. However, as a rotorcraft moves in a flight direction, rotation of the rotor causes each blade thereof to be either "advancing" or "retreating." A blade is advancing if it is moving in the same direction as the flight direction. A blade is retreating if it is moving opposite the flight direction. Thus, the velocity of any point on any blade is the velocity of that point, with respect to the airframe, plus the velocity of the airframe.

Rotor blades are airfoils that provide lift based on the speed of air flow thereover. Accordingly, the advancing blade typically experiences much greater lift than the retreating blade. If left uncheck, this disproportionate lift may render the rotorcraft unflyable. One solution to this problem is allowing the rotor blades to "flap." Flapping enables rotorcraft to travel in a direction substantially perpendicular to the axis of rotation of the rotor.

With flapping, an advancing blade is allowed to fly or flap upward in response to the increased air speed thereover, thereby reducing the blade's angle of attack. This, in turn, reduces the lift generated by the advancing blade. A retreating blade experiences less air speed and tends to fly or flap downward such that its angle of attack is increased. This, in turn, increases the lift generated by the retreating blade. In this manner, flapping balances the lift generated by the advancing and retreating blades.

However, lift equalization due to flapping is limited by retreating blade stall. As noted above, flapping of the rotor blades increases the angle of attack of the retreating blade. At certain higher speeds in the direction of flight, the increase in the blade angle of attack required to equalize lift results in loss of lift (stalling) of the retreating blade.

A second limit on the speed of rotorcraft is the drag at the tips of the rotor blades. The tip of the advancing blade is moving at a speed equal to the speed of the aircraft relative to the surrounding air, plus the speed of the tip of the blade with respect to the aircraft. Thus, the speed at the tip of an advancing blade is equal to the sum of the flight speed of the rotorcraft plus the product of the length of the blade and the angular velocity of the rotor.

In helicopters, the rotor must rotate to provide both upward lift and thrust in the direction of flight. Increasing the speed of a helicopter increases the air speed at the tip, both because of the increased flight speed as well as the increased angular velocity of the rotors required to provide supporting thrust. The speed at the tip of the advancing blade could therefore approach the speed of sound, even when the flight speed of the rotorcraft was actually much less. As the air speed over the tip approaches the speed of sound, the drag on the blade becomes greater than the engine can overcome. Accordingly, helicopters are quite limited in how fast they can fly.

In autogyro aircraft, the tips of the advancing blades are also subject to this increased drag, even for flight speeds much lower than the speed of sound. The tip speed for an autogyro is typically smaller than that of a helicopter, for a given airspeed, since the rotor is not driven. Nevertheless, the same drag increase occurs eventually.

A third limit on the speed of rotorcraft is reverse air flow over the retreating blade. As noted above, the retreating blade is traveling opposite the flight direction with respect to the airframe. At certain high speeds in the direction of flight, portions of the retreating blade may move rearward, with respect to the airframe, slower than the flight speed of the airframe. Accordingly, the direction of air flow over those portions of the retreating blade is reversed from that typically designed to generate positive lift.

Rather then generating positive lift, reverse air flow may impose negative lift, or a downward force, on the retreating blade. That is, an airfoil with positive angle of attack in a first direction has a negative angle of attack in a second direction, opposite the first direction.

The ratio of air speed of a rotorcraft in the direction of flight to the maximum corresponding air speed at the tips of the rotor blades is known as the "advance ratio." The maximum advance ratio of currently available rotorcraft is less than 0.5. For most helicopters, the maximum achievable advance ratio is between about 0.3 and 0.4. Accordingly, current rotorcraft are limited to a top flight speed of about 200 miles per hour (mph) or less.

In view of the foregoing, it would be an advancement in the art to provide a rotorcraft capable of flight speeds well in excess of 200 mph.

BRIEF SUMMARY OF THE INVENTION

The invention has been developed in response to the present state of the art and, in particular, in response to the problems and needs in the art that have not yet been fully solved by currently available apparatus and methods. The features and advantages of the invention will become more fully apparent from the following description and appended claims, or may be learned by practice of the invention as set forth hereinafter.

Flapping (i.e., bending of a rotor blade up and down) may cause relatively high moments and attendant stresses in a stiff blade-root attachment. Additionally, flapping may also induce relatively high chord-wise loads due to Coriolis forces. These loads may quickly fatigue a rotor. Accordingly, in embodiments in accordance with the present invention, systems may be implemented to limit or minimize flapping loads imposed on a rotor under at least all steady state, and preferably all, flight conditions.

Additionally, a rotor in accordance with the present invention may operate at a wide range of rotational speeds. One or more natural frequencies or harmonic regions corresponding to a rotor may be contained within that range. During the crossing of any such natural frequency, the dynamic response of a rotor to periodic loads may amplified, leading to elevated structural loads and potentially high vibrations. Accordingly, in embodiments in accordance with the present invention, systems may be implemented to minimize the time needed for such natural frequency crossings.

In selected embodiments, to minimize flapping loads and the time required to cross a natural frequency, a rotorcraft in accordance with the present invention may include a tilt mechanism permitting in-flight, real time adjustments to the orientation of a mast with respect to airframe. For example, in selected embodiments, wing incidence may be fixed and selected to allow both the wings and the rest of the airframe to operate at their best lift-to-drag ratio. However, a tilt mechanism may enable a rotor to move (e.g., tilt, reorient, etc.) with respect to an oncoming airflow and provide another control over rotor disk angle of attack, independent of collective and cyclic pitch controls.

A tilt mechanism may permit or support only one degree of freedom. For example, a tilt mechanism may support exclusively pivoting of a mast about a laterally extending axis. This may enable a mast (and corresponding rotor) to pitch fore and aft. Alternatively, a tilt mechanism may permit or support more than one degree of freedom. For example, a tilt mechanism may exclusively support pivoting of a mast about a laterally extending axis and about a longitudinally extending axis. This may enable a mast to pitch fore and aft and roll left and right.

In selected embodiments, a tilt mechanism may form part of a control system. For example, in operation, a rotor may need to assume an angle of attack that varies with aircraft gross weight, speed, rotational speed of the rotor, air density, air temperature, and the like. By including a tilt mechanism within a control system, potentially constant changes may be made to the orientation of a mast in order to optimize selected functions, performance, or the like of the corresponding rotorcraft.

For example, in selected embodiments, a control system may include one or more sensors outputting signal characterizing one or more flapping loads being experienced by a rotor. This signal may be fed into an aeromechanics model of the rotorcraft running on an onboard computer system. The aeromechanics model may be solved in real time by the computer system. Based on the outputs of the model, the computer system may issue commands to various actuators. For example, the computer system may issue one or more commands to a tilt mechanism. Acting on the commands, the tilt mechanism may reorient a corresponding mast, pivoting it from first position to a second position. The second position may correspond to lower flapping loads, given current flight conditions.

Alternatively, or in addition thereto, a control system may be configured to minimize the time needed for crossing certain natural frequencies of a rotor. In selected embodiments, a control system may include and manipulate controls over rotor longitudinal and lateral cyclic pitch, rotor collective pitch, rotor mast longitudinal tilt, rotor mast lateral tilt, fixed wing pitch, roll, and yaw controls (e.g., elevator, ailerons, rudder), rotorcraft thrust, or the like or combinations or sub-combinations thereof.

For example, during flight conditions when the rotational speed of a rotor is removed by a proper separation from a critical harmonic, a computer system running a aeromechanics model may continuously sets all available controls to achieve a best overall lift-to-drag ratio and minimize flapping. However, as a pilot transitions a rotorcraft through a critical harmonic, the aeromechanics model may temporarily transition from a first mode corresponding to best overall lift-to-drag ratio to a second mode corresponding to fastest change in rotational speed of the rotor.

In a second mode effecting a decrease in rotational speed of a rotor, a rotor may be tilted further forward than required for steady state autorotation. The result may be a rapid slowing in the rotational speed of the rotor to a value desired at the airspeed above the critical frequency crossing. In a second mode effecting an increase in rotational speed of a rotor, a rotor may be tilted further aft than required for steady state autorotation. The result may be a rapid increase in the rotational speed of the rotor to a value desired at the airspeed below the critical frequency crossing. Once a crossing has been made and a proper separation has been established, an aeromechanics model may transition back to a first mode corresponding to best overall lift-to-drag ratio.

BRIEF DESCRIPTION OF THE DRAWINGS

The foregoing features of the present invention will become more fully apparent from the following description and appended claims, taken in conjunction with the accompanying drawings. Understanding that these drawings depict only typical embodiments of the invention and are, therefore, not to be considered limiting of its scope, the invention will be described with additional specificity and detail through use of the accompanying drawings in which:

DETAILED DESCRIPTION OF SELECTED EMBODIMENTS

Figure 1:
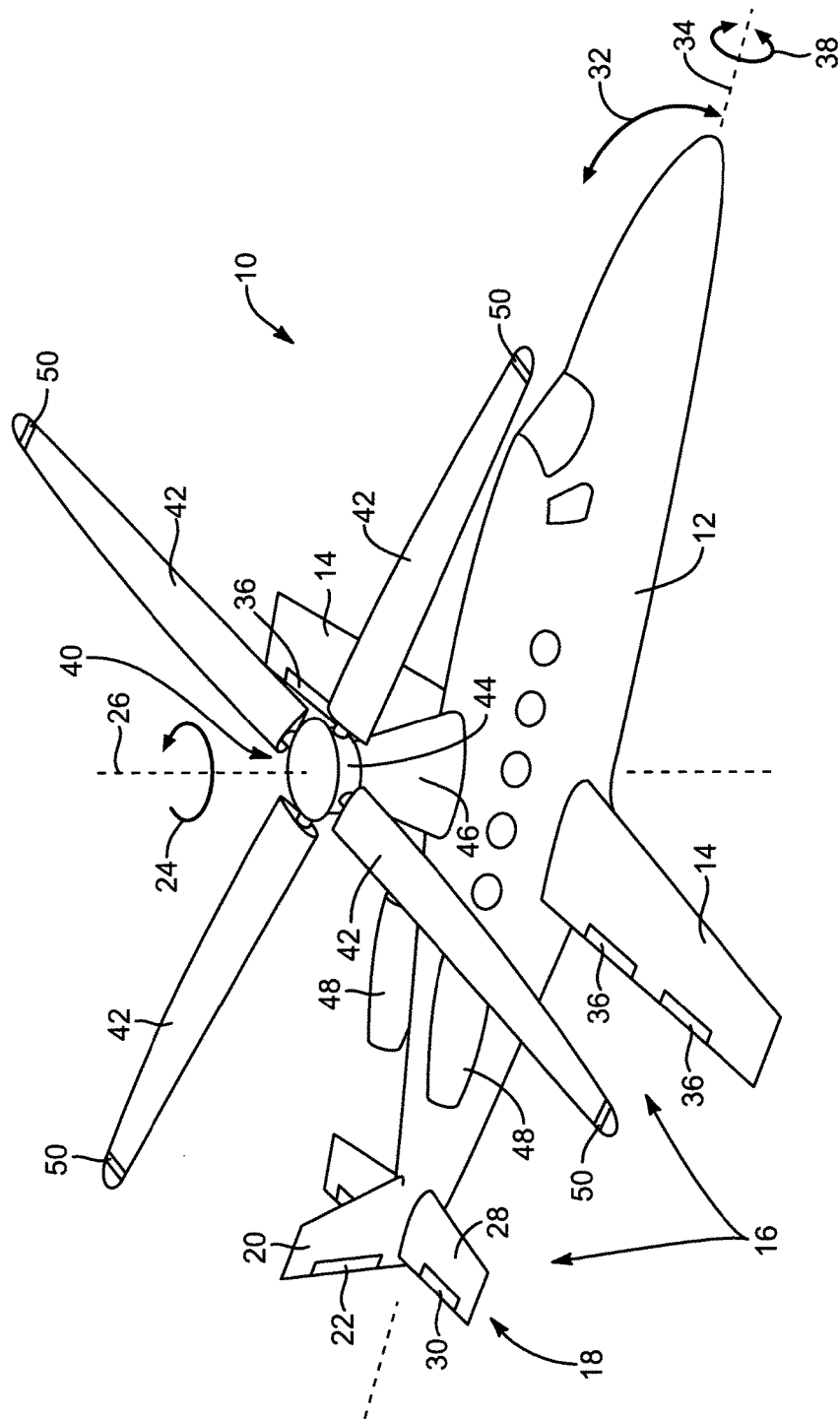
FIG. 1 is a perspective view of a rotorcraft in accordance with one embodiment of the present invention, the rotorcraft having two engines and one rotor.

It will be readily understood that the components of the present invention, as generally described and illustrated in the drawings herein, could be arranged and designed in a wide variety of different configurations. Thus, the following more detailed description of the embodiments of the system and method of the present invention, as represented in the drawings, is not intended to limit the scope of the invention, as claimed, but is merely representative of various embodiments of the invention. The illustrated embodiments of the invention will be best understood by reference to the drawings, wherein like parts are designated by like numerals throughout.

Referring to FIG. 1, a rotorcraft 10 in accordance with the present invention may include an airframe 12 defining a cabin for carrying an operator, passengers, cargo, or the like. The airframe 12 may include one or more fixed wings 14 or airfoils 14 providing lift to the rotorcraft 10. The wings 14 may be configured such that they provide sufficient lift to overcome the weight of the rotorcraft 10 (or any significant portion thereof) only at comparatively high speeds.

That is, a rotorcraft 10 may be capable of vertical takeoff and landing (VTOL) and may not need lift from the fixed wings 14 at low speeds (e.g., below 50 mph or even 100 mph). Accordingly, the wings 14 may be made smaller than those of fixed-wing aircraft requiring a high velocity takeoff. The smaller wings 14 may result in lower drag at higher velocities. In some embodiments, the wings 14 may provide sufficient lift to support at least 50 percent, preferably about 90 percent, of the weight of the rotorcraft 10 at air speeds above 200 mph.

Control surfaces 16 may form part of an airframe 12. For example a tail structure 18 may include one or more vertical stabilizers 20 and one or more rudders 22. The rudders 22 may be adjustable to control yaw 24 of the rotorcraft 10 during flight. As known in the art, yaw 24 is defined as rotation about a vertical axis 26 of the rotorcraft 10. In the illustrated embodiment, the rudders 22 may comprise hinged portions of the vertical stabilizers 20.

The tail structure 18 may further include a horizontal stabilizer 28 and an elevator 30. The elevator 30 may be adjustable to alter pitch 32 of the rotorcraft 10. As known in the art, pitch 32 is defined as rotation about an axis extending laterally with respect to the airframe 10. In the illustrated embodiment, the elevator 30 is a hinged portion of the horizontal stabilizer 28. In some embodiments, twin rudders 22 may be positioned at an angle relative to the vertical axis 26 and serve both to adjust or control yaw 24 and pitch 32 of the rotorcraft 10.

The control surfaces 16 may also include ailerons 36 on the wings 14. Ailerons 36 may be used to control roll 38 of the rotorcraft 10. As known in the art, roll 38 is defined as rotation about the longitudinal axis 34 of the rotorcraft 10.

Lift during vertical takeoff and landing, and for augmenting lift of the wings 14 during flight, may be provided by a rotor 40. A rotor 40 may comprise a number of individual rotor blades 42 extending radially away from a hub 44. The hub 44 may be coupled to a mast 46. The mast 46 may extend to connect the hub 44 to the rest of the airframe 12.

Figure 2:
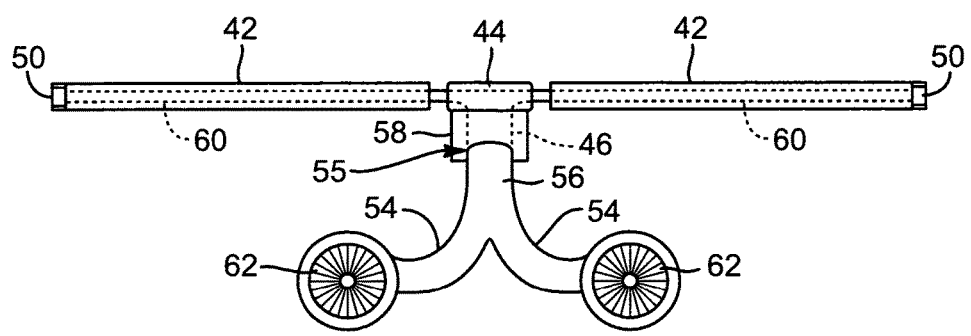
FIG. 2 is a schematic front elevation view of a compressed or otherwise pressurized air supply for tip jets in accordance with one embodiment of the present invention.

Referring to FIG. 2, a rotor 40 may be coupled to one or more engines 48 housed in a fuselage portion of the airframe 12 or in one or more adjacent nacelles. The engines 48 may provide thrust during flight of the rotorcraft 10. The engines 48 may also generate compressed air for the tip jets 50.

For example, in selected embodiments, the engines 48 may comprise one or more bypass turbines 62. All or a portion of the bypass air from the turbines 62 may be directed to the tip jets 50. Alternatively, the engines 48 may drive one or more auxiliary compressors, which in turn may provide the compressed air for the tip jets 50. In still other embodiments, all or a portion of the compressed air may be generated by one or more dedicated, single purpose engines, motors, or the like. Using the compressed air, the tip jets 50 may power the rotor 40 during takeoff, landing, hover, or whenever the flight speed of the rotorcraft 10 is too low for sufficient lift from autorotation of the rotor 40.

In selected embodiments, the compressed air generated by the engines 48 may be conducted to the tip jets 50 via one or more conduits or ducts 54, 55. For example, bypass air from one or more bypass turbines 62 may be transmitted through ducts 54 to a plenum 56. The plenum 56 may be in fluid communication via ducting 55 with a mast 46 that is hollow or has another passage to provide for air conduction. For example, a mast fairing 58 positioned around the mast 46 may provide one or both of an air channel and a low drag profile for the mast 46. The mast 46 or mast fairing 58 may be in fluid communication with a hub 44. Finally, the hub 44 may be in fluid communication with an interior conduit 60 within each of the various rotor blades 42. Accordingly, the compressed air may travel radially within the interior conduits 60 to feed the corresponding tip jets 50.

Figure 3A:
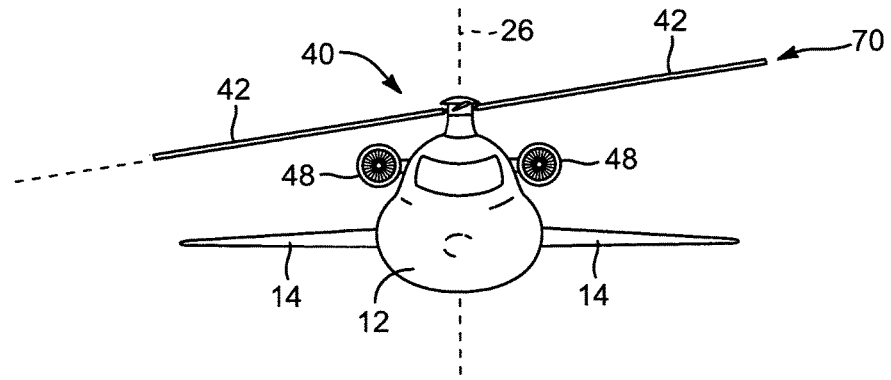
FIG. 3A is a front elevation view of a rotorcraft illustrating operational parameters describing a rotor configuration suitable for use in accordance with the present invention and the system of FIGS. 1 and 2 in particular.
Figure 3B:
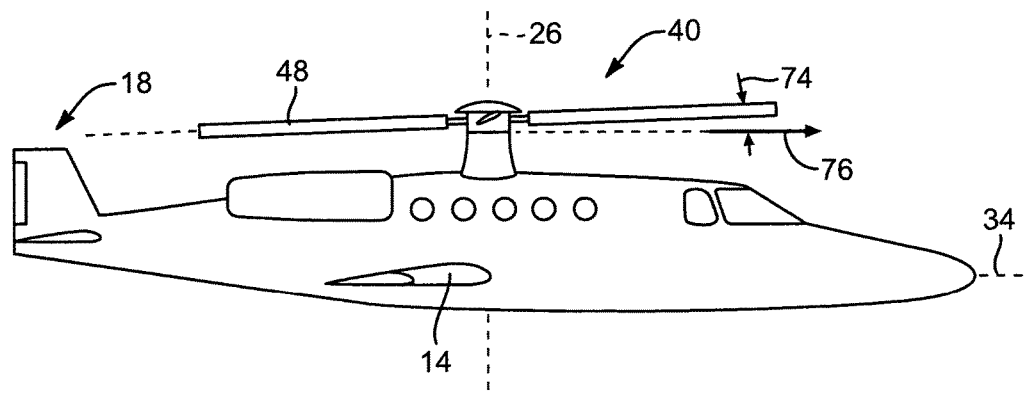
FIG. 3B is a right side elevation view of the rotorcraft of FIG. 3A.
Figure 3C:
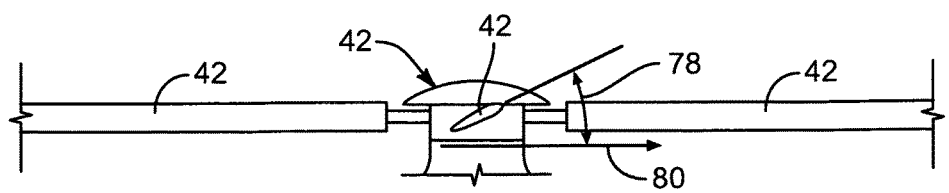
FIG. 3C is a partial cut of a right side elevation view of the rotor of FIG. 3A.

Referring to FIGS. 3A-3C, rotation of the rotor 40 about its axis of rotation occurs in a rotor disc 70 that is generally planar but may be contoured due to flexing of the blades 42. In general, the rotor disc 70 may be defined as a space in which the tips of the blades 42 travel. Inasmuch as the blades 42 flap cyclically upward and downward due to changes in lift while advancing and retreating, the rotor disc 70 may be angled or contoured with respect to the axis of rotation when viewed along the longitudinal axis 34, as shown in FIG. 3A.

Referring to FIG. 3B, the angle 74 of the rotor disc 70, relative to a flight direction 76 in the plane containing the longitudinal axis 34 and vertical axis 26, is defined as the rotor angle of attack 74 or rotor disk angle of attack 74. For purposes of this application, flight direction 76 and air speed refer to the direction and speed, respectively, of the airframe 12 of the rotorcraft 10 relative to surrounding air. In autogyro systems, the angle of attack 74 of the rotor disc 70 is generally positive in order to achieve autorotation of the rotor 40 and the resulting lift.

Referring to FIG. 3C, the surfaces of the rotor blades 42, and particularly the chord of each blade 42, define a pitch angle 78, or blade angle of attack 78, relative to the direction of movement 80 of the rotor blades 42. In general, a higher pitch angle 78 will result in more lift and higher drag on the rotor blade 42, up to the point where stalling occurs (at which point lift has declined below a value necessary to sustain flight). The pitch angle 78 of the rotor blade 42 may be manipulated by both cyclic and collective pitch controls.

Herein, a trailing letter on a reference numeral indicates a specific instance of the generic item indicated by the reference numeral. Thus reference may be made in the text to a generic item corresponding to a reference numeral, without using a trailing reference letter, even though that numeral is never shown in the drawings without such a trailing letter.

Figure 4:
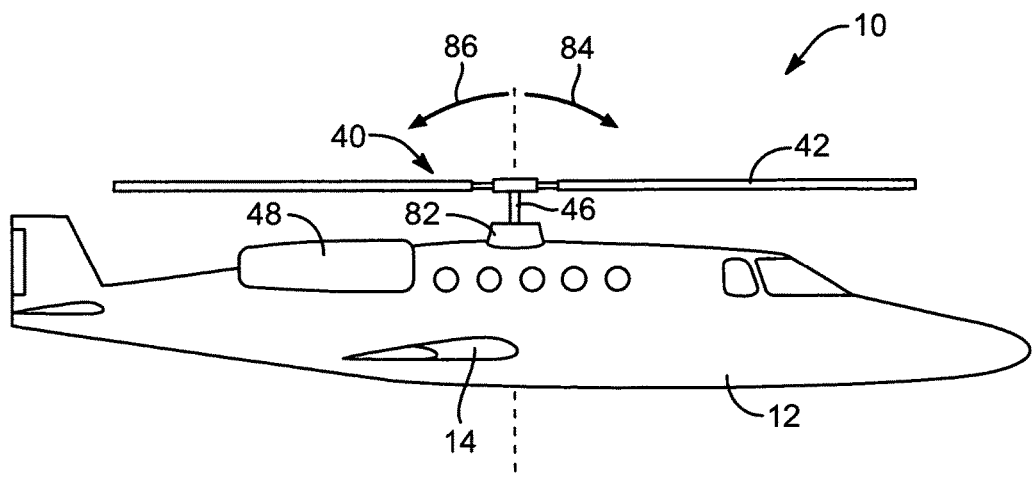
FIG. 4 is a right side elevation view of a rotorcraft illustrating operational parameters describing a rotor mast pivoting about an axis extending laterally in accordance with the present invention.
Figure 5:
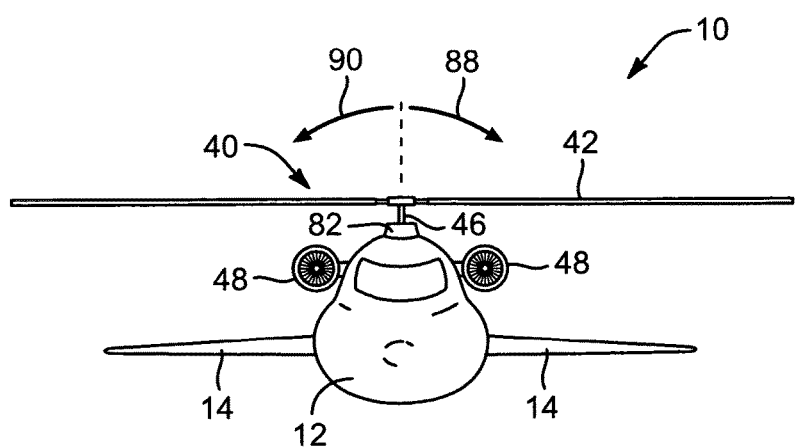
FIG. 5 is a front elevation view of a rotorcraft illustrating operational parameters describing a rotor mast pivoting about an axis extending longitudinally in accordance with the present invention.

Referring to FIGS. 4 and 5, in selected embodiments, a rotorcraft 10 in accordance with the present invention may be suitable for cruise speeds up to 400 mph and above. Above aircraft airspeeds of approximately 40 mph, a rotorcraft 10 may operate as a gyroplane (i.e., an aircraft in which the rotor 40 is driven by external aerodynamic forces only; windmilling) No shaft torque or tip jet thrust need be provided at such speeds. Accordingly, the rotor 40 may be said to be in sustained autorotation.

As long as the rotational speed of a rotor 40 is maintained at a constant value or increased, the airspeed of an advancing blade tip increases with aircraft airspeed, i.e, forward airspeed relative to the surrounding air. Accordingly, it may be necessary for efficiency and other reasons to slow down the rotational speed of the rotor 40 during certain flight conditions (e.g., during high speed flight or flight at high advance ratios). For example, it may be necessary to maintain the airspeed of an advancing blade tip at approximately Mach 0.9 or below.

That is, at low aircraft airspeeds, the rotational speed of a rotor 40 must be maintained at a sufficiently high value to allow the lift provided by the rotor 40 to support the majority of the weight of the rotorcraft 10. However, as aircraft airspeed increases, an advancing blade 42 will reach a Mach number at which drag divergence occurs with its attendant performance penalties. Consequently, as aircraft airspeed increases further, this penalty can only be avoided by slowing the rotational speed of a rotor 40. In certain embodiments, this may comprise slowing the rotational speed of a rotor 40 to about forty percent of the rotational speed corresponding to conventional autorotative flight (e.g., autorotative flight somewhere in the range of about 50 mph to about 100 mph).

A slowed rotor 40, however, may produce less lift, causing more of the weight of the rotorcraft 10 to be transferred to one or more fixed wings 14. Thus, sustained autorotation over the entire gyroplane speed range of a rotorcraft 10 may require appropriate manipulation of a number of controls on the rotor 40 and the fixed wings 14 to achieve an optimized rotorcraft system that is aerodynamic efficient and maintain loads imposed on a rotor 40 within acceptable limits.

The blades 42 and hub 44 of a rotor 40 operating at advance ratios well above a value of two may need to meet certain stiffness requirements. For example, to maintain flapping stability, it may be necessary to maintain a high flap-wise stiffness and a high flapping inertia. It may also be highly desirable to maintain the ratio of a first (lowest fundamental) in-plane natural frequency to rotational cyclic rate of the rotor 40 well above one. Such a rotor 40 may be characterized as "in-plane stiff," where the plane is defined by the rotor disk.

A rotor 40 that is in-plane stiff may avoid crossing a first in-plane natural frequency as the rotor 40 is slowed. This may be desirable because crossing this frequency may easily lead to another instability referred to as air resonance. However, a rotor 40 that is in-plane stiff may still experience two relatively high bending loads.

Specifically, flapping (i.e., bending of a blade 42 up and down) may cause relatively high moments and attendant stresses in a stiff blade-root attachment. Additionally, flapping may also induce relatively high chord-wise loads due to Coriolis forces. These loads may quickly fatigue a rotor 40. Accordingly, in embodiments in accordance with the present invention, systems may be implemented to limit or minimize flapping loads imposed on a rotor 40 under at least all steady state, and preferably all, flight conditions.

The structures and control systems of a rotorcraft 10 in accordance with the present invention may be configured to maintain or meet one or more conditions. For example, a rotorcraft 10 may be configured to maintain a rotor 40 in sustained autorotation and at a controlled rotational speed. This may be accomplished at different rotor-lifting levels, each of which may correspond to a different rotor angle of attack 74 (disk angle 74 or disk angle of attack 74). In selected embodiments, this rotor angle of attack 74 may be determined at least partially by a combination of collective and cyclic pitch settings.

A rotorcraft 10 may be further configured to share or distribute weight between one or more rotors 40 and one or more fixed wings 14 to achieve an optimized overall lift-to-drag ratio. In selected embodiments or situations (e.g., high speed flight or long range cruising), both a rotor 40 and fixed wing 14 may be lifting with a minimized combined drag. In certain embodiments, this may be accomplished at least in part by maintaining low trim drag on various control surfaces (e.g., horizontal stabilizers 30 or elevators 30).

A rotorcraft 10 may be further configured to maintain the loads imposed on a rotor 40 within design limits. In selected embodiments and situations, this may be accomplished by minimizing flapping loads and maintaining a rotor outside of any higher harmonic resonance (i.e., 1/rev. may be automatically avoided by an in-plane stiff design). To minimize flapping loads, a rotorcraft 10 in accordance with the present invention may include a tilt mechanism 82 permitting in-flight, real time adjustments to the orientation of a mast 46 with respect to the airframe 12.

For example, in selected embodiments, wing incidence (angle of attack with respect to the airframe or fuselage) may be fixed and selected to allow both the wings 14 and the rest of the airframe 12 (e.g., fuselage) to operate at their best lift-to-drag ratio. However, a tilt mechanism 82 may enable a rotor 40 to move (e.g., tilt, reorient, etc.) with respect to an oncoming airflow and provide another control over rotor disk angle of attack 74, independent of collective and cyclic pitch controls.

In selected embodiments, a tilt mechanism 82 may permit or support only one degree of freedom. For example, a tilt mechanism 82 may support exclusively pivoting of a mast 46 about a laterally extending axis. This may enable a mast 46 (and corresponding rotor 40) to pitch fore 84 and aft 86. In certain embodiments, a tilt mechanism 82 may support a mast 46 in a nominally "neutral" position. The neutral position may correspond to a particular rotor disk angle of attack 74. From the neutral position, a tilt mechanism 82 may pitch a mast 46 fore 84 to decrease the rotor disk angle of attack 74 and aft 86 to increase the rotor disk angle of attack 74.

In selected embodiments, the maximum rotor disk angle of attack 74 imposed by a tilt mechanism may be about ten degrees or less. Conversely, the minimum rotor disk angle of attack 74 imposed by a tilt mechanism 82 may be from about zero to about negative four degrees, or the like. In selected embodiments, the range of motion of a mast 46 from an angle of attack 74 of about zero degrees to an angle of attack 74 of about negative four degrees may be accessed or utilized exclusively while a rotor 40 is being powered (e.g., by tip jets 50).

In certain embodiments, a tilt mechanism 82 may permit or support more than one degree of freedom. For example, a tilt mechanism 82 may exclusively support pivoting of a mast 46 about a laterally extending axis and about a longitudinally extending axis. This may enable a mast 46 (and corresponding rotor 40) to pitch fore 84 and aft 86 and roll left 88 and right 90. Rolling left 88 and right 90 may enable a tilt mechanism 82 to limit, reduce, or minimize certain forces imposed on a rotor 40 to a degree that cannot fully be addressed by pitching fore 84 and aft 86. In general, the magnitude of the rolling left 88 and right 50 permitted or provided by a tilt mechanism 82 may be small compared to the magnitude of the pitching fore 84 and aft 86. In selected embodiments, the maximum roll to the left 88 or right 90 may be about five degrees or less.

Figure 6:
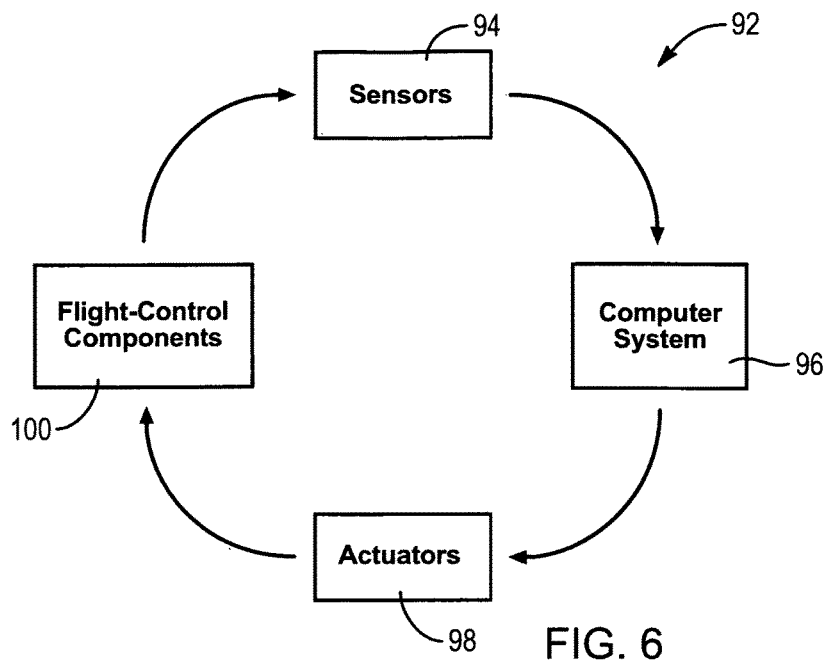
FIG. 6 is a schematic diagram of one embodiment of a control system in accordance with the present invention.

Referring to FIG. 6, in selected embodiments, a rotorcraft 10 may include one or more control systems 92. In certain embodiments, a control system 92 may include one or more sensors 94, one or more independent or interconnected computer systems 96 or controllers 96, one or more actuators 98, and one or more flight-control components 100. Suitable sensors 94 may include strain gauges, accelerometers, airspeed sensors, rotational speed or cycle frequency sensors, and the like. A computer system 96 may receive and interpret a signal from the one or more sensors 94 and issue commands based, at least in part, on the signal or information learned therefrom.

In certain embodiments, a computer system 96 may comprise or run an aeromechanics model of the rotorcraft 10. Inputs corresponding to or comprising signals from the one or more sensors 64 may be fed into the model. The aeromechanics model equations may be solved onboard in real time. Appropriate responses to such inputs may then be relayed by a computer system 96 to one or more actuators 98. Acting on commands received from a computer system 96, the actuators 98 may manipulate corresponding flight-control components 100, which in turn may affect the manner in which the corresponding rotorcraft 10 flies.

Figure 7:
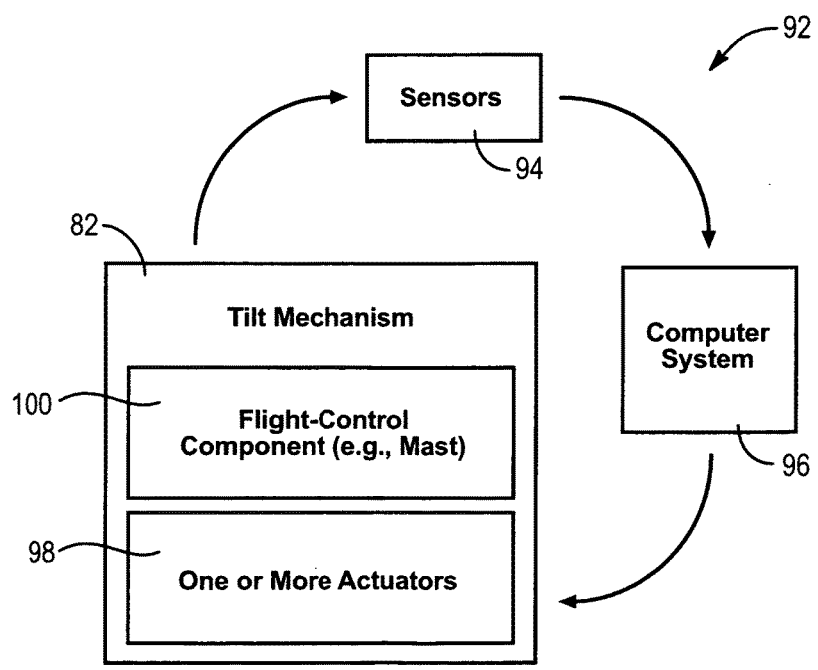
FIG. 7 is a schematic diagram of one embodiment of a control system for controlling the orientation of a rotor mast in accordance with the present invention.

Referring to FIG. 7, in selected embodiments, a tilt mechanism 82 may form part of a control system 92. For example, a tilt mechanism 82 may comprise one or more actuators 98 and flight control components 100 within an automatically variable mast tilt (AVMT) system 92 or dynamically variable mast tilt (DVMT) system 92. In operation, a rotor 40 may need to assume an angle of attack 74 that varies with aircraft gross weight, speed, rotational speed of the rotor 40, air density, air temperature, and the like. By including a tilt mechanism 82 within an AVMT system 92, potentially constant changes may be made to the orientation of a mast 46 in order to optimize selected functions, performance, or the like of the corresponding rotorcraft 10.

An AVMT system 92 may include one or more sensors outputting a signal characterizing one or more flapping loads being experienced by a rotor 14. This signal may be fed into an aeromechanics model of the rotorcraft 10 running on an onboard computer system 96. The equations of the aeromechanics model may be solved in real time by the computer system 96. Based on the outputs of the model, the computer system 96 may issue commands to various actuators 98.

For example, the computer system 96 may issue one or more commands to a tilt mechanism 82. Acting on the commands, the tilt mechanism 82 may reorient a corresponding mast 46, pivoting it from one position to another position. The computer system 96 may also issue one or more complementary commands. For example, the computer system 96 may issue one or more commands to an actuator 98 corresponding to an elevator 30. Accordingly, multiple flight-control components 100 may be adjusted simultaneous, sequentially, or as needed to optimize a selected function, optimize aerodynamic performance, contain or minimize a structural load (e.g., flapping load), or the like or combinations or sub-combinations thereof. Thus, in selected embodiments, an AVMT system 92 may enable a rotorcraft 10 in accordance with the present invention to maintain flapping loads near or substantially at zero and control the rotational speed (radians per second) or its corresponding equivalent rotational frequency (cycles per second) of a rotor 40 not only in cruise flight, but also during dynamic rotorcraft maneuvers.

Figure 8:
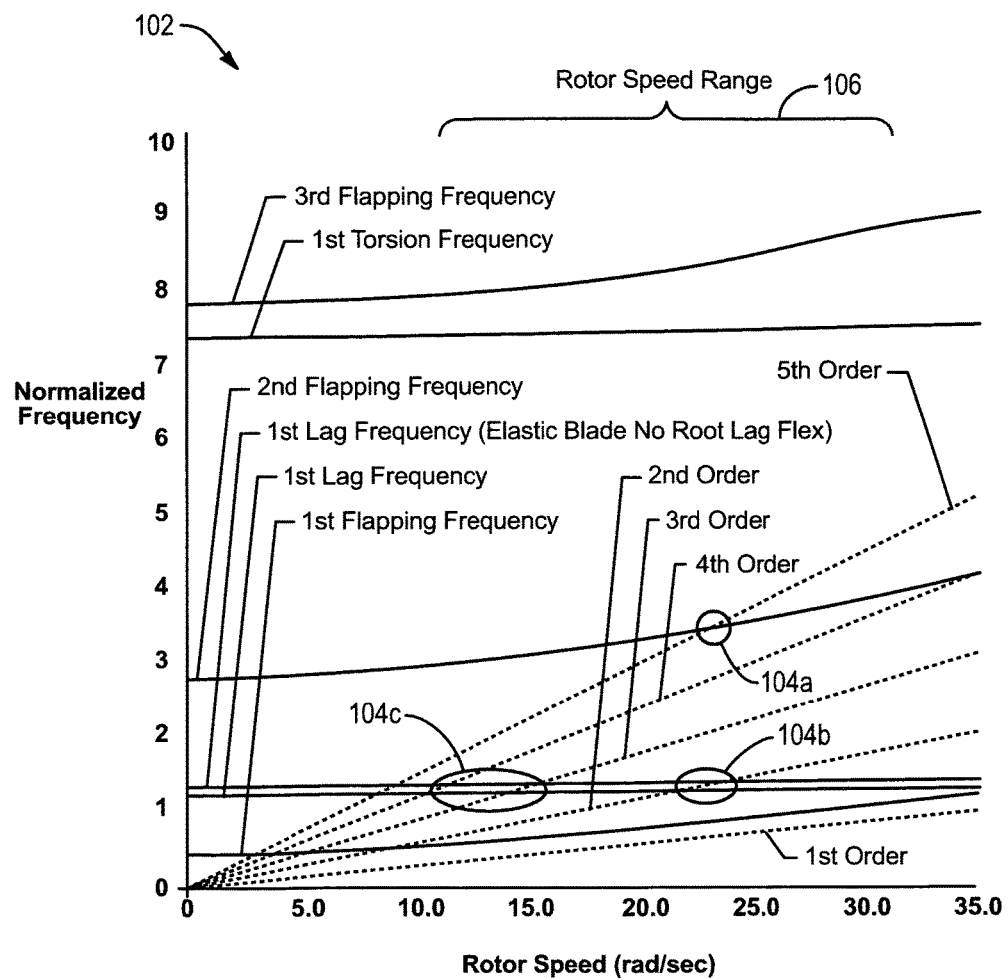
FIG. 8 is a graph illustrating various natural frequencies or harmonics that may be encountered within the operating envelope of a rotor in accordance with the present invention.
Figure 9:
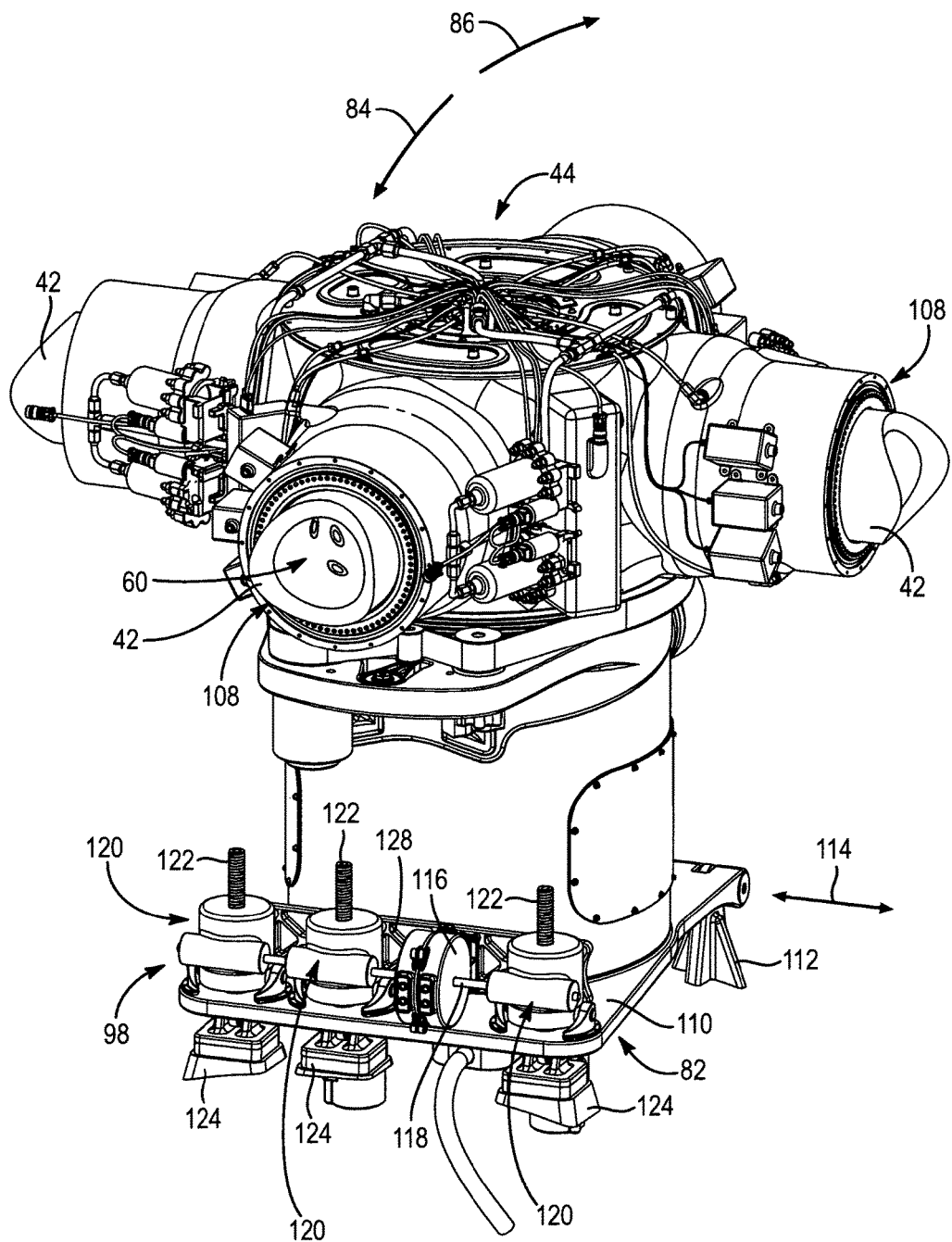
FIG. 9 is a partial perspective view of one embodiment of a rotor, mast, and tilt mechanism in accordance with the present invention.
Figure 10:
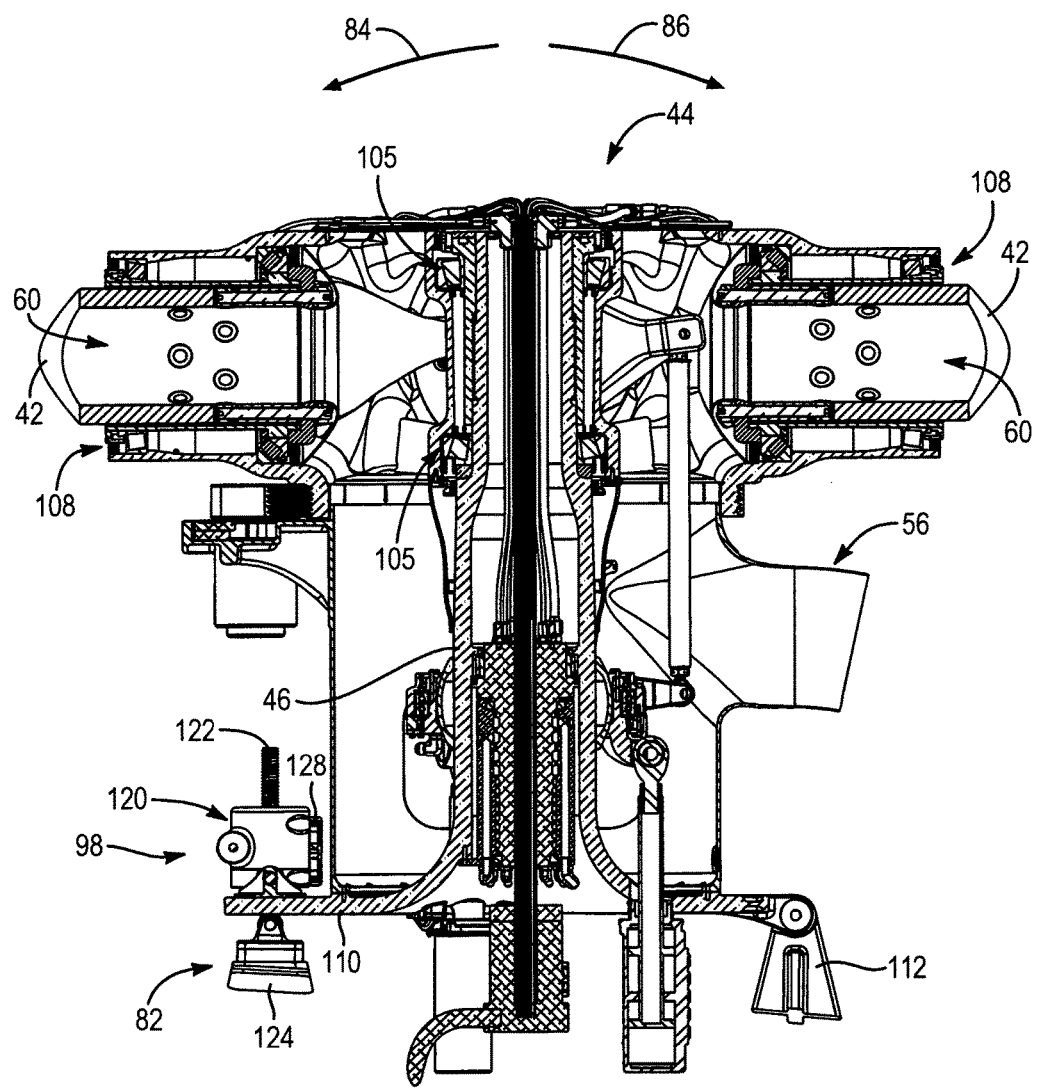
FIG. 10 is a cross-sectional view of the rotor, mast, and tilt mechanism of FIG. 9.
Figure 11:
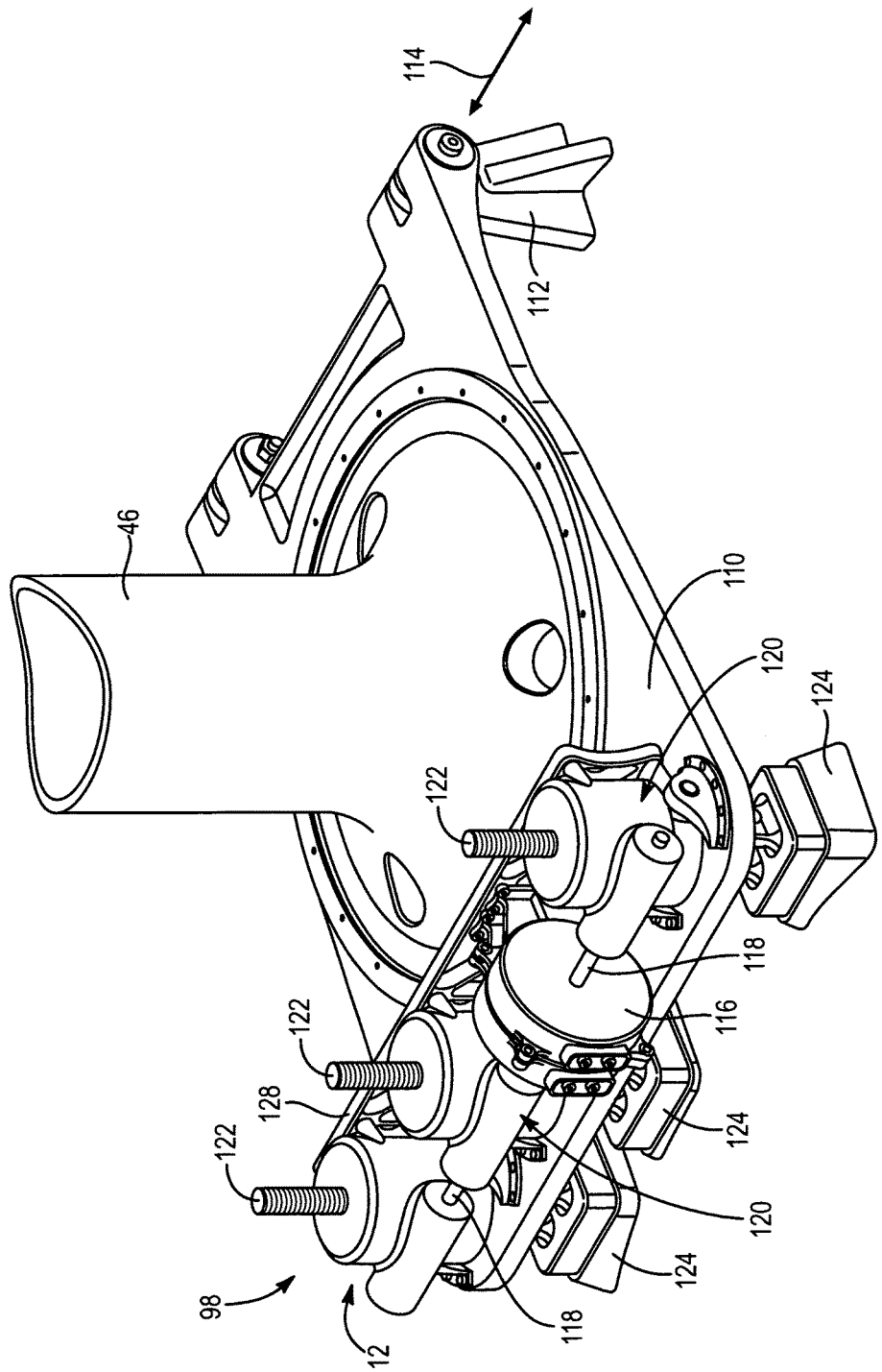
FIG. 11 is a partial perspective view of the mast and tilt mechanism of FIG. 9.
Figure 12:
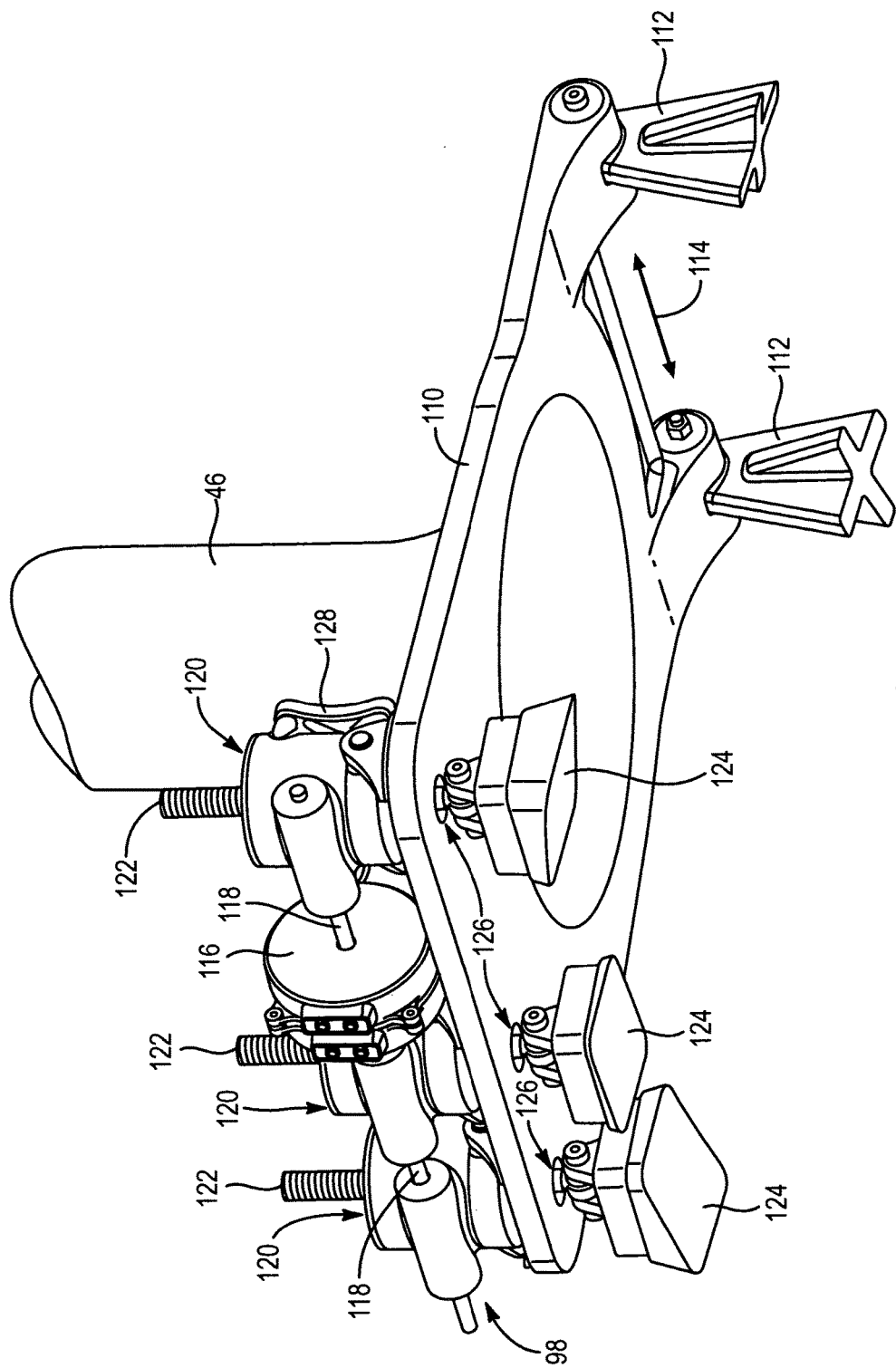
FIG. 12 is another partial perspective view of the mast and tilt mechanism of FIG. 9.

Referring to FIG. 8, in selected embodiments, a tilt mechanism 82 in accordance with the present invention may be used to limit, contain, or control the dynamic response of rotor blades 42 when traversing natural frequencies of a rotor 40. That is, as a rotor 40 transitions from a relatively higher rotational speed (or corresponding cyclic frequency), needed for low speed flight, to a relatively lower rotational speed, needed for high speed flight, and then back again, the rotor 40 must typically cross at least one natural frequency of the rotor blade. Accordingly, in selected embodiments, a tilt mechanism 82 may be configured and operated to mitigate such crossings.

As stated above, to maintain flapping stability, it may be necessary to maintain a high flap-wise stiffness as well as a high flapping inertia. This may be due to the fact that the centrifugal stiffening of a rotor 40 operating at forty percent of nominal rotational speed (e.g., the relatively high rotational speed that may be associated with conventional sustained autorotative flight) may have the benefit of only about sixteen percent of the normal centrifugal stiffening. High flap-wise stiffness, on the other hand, may reduce the amount of flapping a rotor 40 can sustain within structural fatigue limits (e.g., reduce permitted flapping deflection to something on the order of about two degrees). This amount of flapping may be insufficient to position the rotor tip path plane relative to the fuselage and wing system and the free stream of air for optimal trim efficiency and during maneuvers. A rotorcraft 10 in accordance with the present invention may include an AVMT system 92 to overcome this constraint.

A rotor 40 that is in-plane stiff may avoid crossing a first in-plane natural resonance mode, which has very low damping, as the rotor 40 slows. Since a rate of 1/revolution excitations tend to be large, crossing this frequency could easily lead to unacceptably high structural loads. A rotor 40 in accordance with the present invention may be in-plane stiff to avoid this frequency. However, when the rotational speed of a rotor 40 decreases in flight by as much as sixty percent, other natural frequencies with higher harmonic excitations may be unavoidable.

FIG. 8 provides a typical frequency diagram 102 for a rotor 40 that is in-plane stiff. The diagram 102 illustrates three natural frequency crossings 104a, 104b, 104c or crossing regions 104a, 104b, 104c within the range 106 of rotational speeds to be experienced by a rotor 40. During any such crossing 104a, 104b, 104c or region 104a, 104b, 104c of a natural frequency, the dynamic response of a rotor 40 to periodic loads may amplified, leading to elevated structural loads and potentially high vibrations.

Accordingly, it may be desirable to have a control system 92 minimize the time needed for such natural frequency crossing 104a, 104b, 104c. Such a control system 92 may execute the crossing 104a, 104b, 104c using exclusively aerodynamic forces, since the rotor 40 may not be powered through the shaft or any reaction drive device (e.g., tip jet 50 or the like).

In operation, as a rotorcraft 10 increases speed (e.g., using jet or propeller thrust) to achieve cruise speed, the rotational speed of a rotor 40 may be slowed in a smooth and continuous fashion up to a point when a natural frequency is impending. At any such point, the rotational speed of the rotor 40 may be "stepped down" to below the frequency crossing 104a, 104b, 104c with a proper separation therefrom (e.g., a separation of about three percent). The same may be true, but in reverse, during deceleration of the rotorcraft 10.

To make this happen, a rotorcraft 10 may remain trimmed and not exhibit any objectionable pitch, roll, or yaw oscillations while the rotational speed of a rotor 40 is stepped down or up. The rotational speed of the rotor 40 may be decreased or increased in minimum time. Additionally, flapping loads may be kept to a minimum.

A control system 92 configured to minimize the time needed for crossing 104a, 104b, 104c a natural frequency may include and manipulate controls 100 over rotor longitudinal and lateral cyclic pitch, rotor collective pitch, rotor mast longitudinal tilt, rotor mast lateral tilt, fixed wing pitch, roll, and yaw controls (e.g., elevator 30, ailerons 36, rudder 22), rotorcraft thrust, or the like or combinations or sub-combinations thereof.

During flight conditions when the rotational speed of a rotor 40 or corresponding cyclic frequency is removed by a proper separation (e.g., a three percent separation) from a critical harmonic, a computer system 96 running an aeromechanics model may continuously set all available controls to achieve a best overall lift-to-drag ratio and minimize flapping. However, as a pilot transitions a rotorcraft 10 through a critical harmonic, the aeromechanics model may temporarily transition from a first mode corresponding to best overall lift-to-drag ratio to a second mode corresponding to a fastest change in rotational speed of the rotor 40.

In selected embodiments, in this second mode or during a transition thereto, a computer system 96 may pre-compute a desired steady state trim for the airspeed and rotational speed of a rotor 40 corresponding to a proper separation from the natural frequency or frequencies. In a second mode effecting a decrease in rotational speed of a rotor 40 (i.e., an acceleration of the rotorcraft 10), a rotor 40 may be tilted further forward 84 than required for steady state autorotation. Additionally, such a second mode may mandate operating one or more engines 48 at maximum thrust to make the crossing 104a, 104b, 104c as quickly as possible. The result may be a rapid slowing in the rotational speed of the rotor 40 to a value desired at the airspeed above the critical frequency crossing 104a, 104b, 104c that corresponds to a proper frequency separation. This method of transition may be characterized as a dynamic transition.

In a second mode effecting an increase in rotational speed of a rotor 40 (i.e., a deceleration of the rotorcraft 10), a rotor 40 may be tilted further aft 86 than required for steady-state autorotation. Additionally, such a second mode may mandate operating one or more engines 48 at minimum thrust to make the crossing 104a, 104b, 104c as quickly as possible. The result may be a rapid increase in the rotational speed of the rotor 40 to a value desired at the airspeed below the critical frequency crossing 104a, 104b, 104c that corresponds to a proper frequency separation.

For a dynamic transition, it may be necessary for a computer system 96 to predict the entire transition sequence, including the associated airspeed change and change in lift sharing between a rotor 40 and wing 14 for the flight condition of the rotorcraft 10 at the time. An accurate knowledge of the gross weight of the rotorcraft 10 may be important. Considering the need for the lift provided by the rotor 40 and the lift provided by the wing 14 to change independently and simultaneously, keeping flapping loads within allowable limits may also be important. As lateral-tip-path-plane motions may occur during the precession of the tip path plane, a tilt mechanism 82 may provide or support tilting left 88, tilting right 90, or some combination thereof.

Once a crossing 104a, 104b, 104c has been made and a proper separation has been established, an aeromechanics model may transition back to a first mode corresponding to obtaining the best overall lift-to-drag ratio. A proper separation from the rotational speed corresponding to a natural frequency of a blade may correspond to a separation in the airspeed of the rotorcraft 10 that maintains a constant advancing blade Mach number above or below the value at a crossing 104a, 104b, 104c.

In selected embodiments, an alternative method for effecting a crossing 104a, 104b, 104c may be employed. One such alternative method may be referred to as a static transition. During a static transition, the airspeed of a rotorcraft 10 may be held constant by one or more engines 48. However, the trimming (e.g., collective pitch, cyclic pitch, mast tilt, etc.) of a corresponding rotor 40 may be manipulated to achieve the lower or higher rotational speed with a proper separation from the critical speed. This method may be employed if, for whatever reason (e.g., air-traffic control situations), the airspeed of the rotorcraft 10 must be maintained.

Referring to FIGS. 9-12, in selected embodiments, a hub 44 may rotate about a mast 46. This rotation may be enabled by one or more mast bearings 105. A mast 46 may cooperate with a hub 44 to form a manifold. A flow of compressed air generated by one or more engines 48 may be delivered to this manifold by a plenum 56 connected to the mast 46. After entering the manifold, the flow of compressed air may divide as it passes through the various feathering spindles 64 and enters the internal conduits 60 of the corresponding rotor blades 42.

A hub 44, feathering spindle 64, and rotor blade 42 arrangement in accordance with the present invention may provide an assembly that remains suitably rigid in the desired directions or degrees of freedom throughout the design temperature and load ranges. Accordingly, the hub 44, feathering spindle 64, and rotor blade 42 arrangement may ensure that the rotor 40 meets the flapping, lead-lag, and torsional stiffness requirements throughout the flight envelope.

In selected embodiments, a mast 46 may comprise or be connected to a base 110. A base 110 may form part of a tilt mechanism 82. Accordingly, a base 110 may comprise a platform or other structure that may be manipulated (e.g., oriented or reoriented) to control the orientation or tilt of a mast 46. In certain embodiments, a base 110 may pivotably engage one or more pivot mounts 112 connected to the rest of an airframe 12. The pivot mounts 112 may be configured and positioned to permit a base 110 to pivot with respect thereto. For example, in the illustrated embodiment, the pivot mounts 112 enable a base 110 (and corresponding mast 46) to pivot about an axis 114 extending laterally with respect to an airframe 12.

An actuator 98 or actuation system 98 may control and motivate the pivoting of a base 110. In selected embodiments, an actuation system 98 may include a motor 116 (e.g., pancake motor) controlling rotation of a drive shaft 118. Connected to a drive shaft 118 may be one or more worm drives 120. Each worm drive 120 may engage a corresponding threaded member 122. Accordingly, rotation by a motor 116 of a drive shaft 118 in a first direction may cause a worm drive 120 to advance along a corresponding member 122. Conversely, rotation by a motor 116 of a drive shaft 118 in a second direction, opposite to the first direction, may cause a worm drive 120 to retreat along a corresponding threaded member 122.

Motion along a threaded member 122 may be used to pivot a base 110 with respect to one or more pivot mounts 112. For example, in selected embodiments, a first end of each threaded member 122 may be pivotably connected to an actuator mount 124 connected to the rest of an airframe 12. Each threaded member 122 may extend from a corresponding actuator mount 124 to engage a corresponding worm drive 120. In selected embodiments, a threaded member 122 may extend through an aperture 126 in the base 110 to engage a worm drive 120. The aperture 126 may be oversized to accommodate the full range of motion of the threaded member 122 therewithin.

In selected embodiments, each worm drive 120 may be connected to the base 110. Accordingly, motion of a worm drive 120 along a threaded member 122 may result in pivoting of a base 110 about one or more pivot mounts 112. A worm drive 120 may be connected to a base 110 in any suitable manner. As a worm drive 120 travels along a threaded member 122 and a base 110 pivots, an orientation of the threaded member 122 with respect to the base 110 may change. Accordingly, in selected embodiments, each worm drive 120 may pivotably connect to the base 110. This may enable a worm drive 120 to follow a corresponding threaded member 122 as the threaded member 122 changes its orientation with respect to the base 110.

In certain embodiments, a frame 128 may extend to connect various worm drives 120 together. This may ensure that the worm drives 120 all pivot in concert, in a uniform manner with respect to a corresponding base 110. A frame 128 may also provide a location for securing a motor 116 in a fixed relationship with respect to the worm drives 120 driven thereby.

Figure 13:
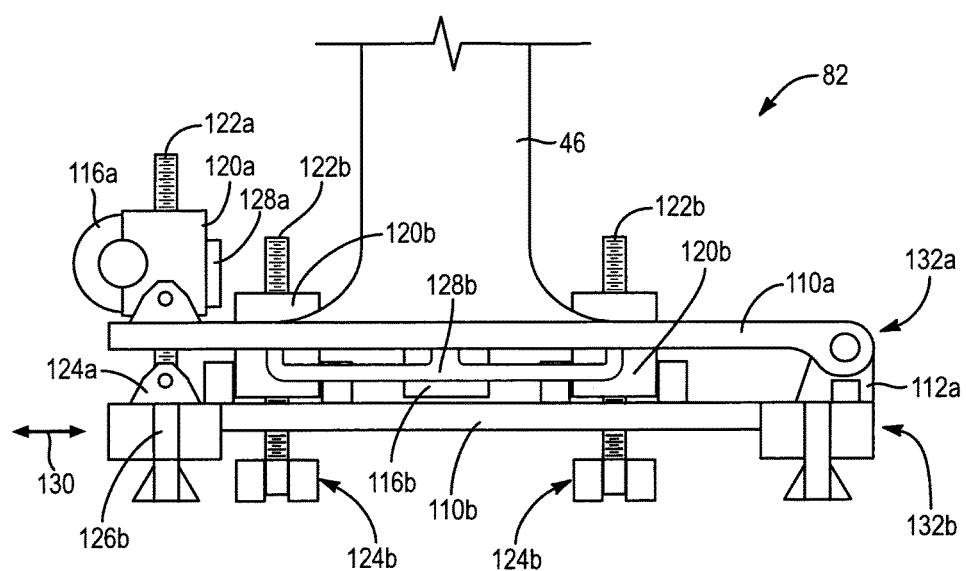
FIG. 13 is a partial side view of one embodiment of a tilt mechanism supporting pivoting of a rotor mast about two independent, orthogonal axes.

Referring to FIG. 13, in selected embodiments, a tilt mechanism 82 may support pivoting of a mast 46 about multiple axes. For example, in addition to supporting pivoting about an axis 114 extending laterally, a tilt mechanism 82 may support pivoting of a mast 46 about an axis 130 extending longitudinally with respect to an airframe 12. A tilt mechanism 82 may accomplish this in any suitable manner.

In selected embodiments, a tilt mechanism 82 may use layers 132 to support pivoting of a mast 46 about multiple axes 114, 130. A first layer 132a may include a base 110a, pivot mounts 112a, motor 116a, drive shaft 118, one or more worm drives 120a, actuator mounts 124a, frame 128a, etc. supporting pivoting of a mast 46 about a first axis (e.g., an axis 114 extending laterally). A second layer 132b may include a base 110b, pivot mounts 112b, motor 116b, drive shaft 118, one or more worm drives 120b, actuator mounts 124b, frame 128b, etc. supporting pivoting of a mast 46 about a second axis (e.g., an axis 130 extending longitudinally).

A mast 46 may comprise or connect to a base 110a of a first layer 132a. Rather than connecting directly to the rest of an airframe 12, the pivot mounts 112a and actuator mounts 124a of the first layer 132a may connect directly to a base 110b of a second layer 132b. Accordingly, the pivot mounts 112b and actuator mounts 124b of the second layer 132b may be those that connect directly to the rest of an airframe 12. Thus layers 132 may be connected to other layers 132 in order to move components with respect to one another in modes or degrees of freedom provided by the layers.

The present invention may be embodied in other specific forms without departing from its spirit or essential characteristics. The described embodiments are to be considered in all respects only as illustrative, and not restrictive. The scope of the invention is, therefore, indicated by the appended claims, rather than by the foregoing description. All changes which come within the meaning and range of equivalency of the claims are to be embraced within their scope.

What is claimed and desired to be secured by United States Letters Patent is:

1. A method comprising:
    flying a rotorcraft comprising
        an airframe,
        a propulsion source,
        a rotor operably connected to rotate with respect to the airframe, a mast extending to connect the rotor to the airframe,
a tilt mechanism operable to tilt the rotor with respect to the airframe, and
a computer system operably connected to detect operational characteristics of the rotorcraft and effect control thereof;
identifying, by the computer system, during the flying, (a) an impending crossing of a natural frequency of the rotor;
issuing in real time, by the computer system, in response to the identifying (a), at least one command to the tilt mechanism; and
reorienting in real time, by the tilt mechanism, in response to the at least one command, the mast with respect to the airframe while also adjusting at least one of collective pitch and cyclic pitch effective to increase speed at which the natural frequency is crossed.

2. The method of claim 1, wherein the reorienting comprises pivoting the mast with respect to the airframe from a first position to a second position.

3. The method of claim 1, wherein the flying comprises sustained autorotative flight.

4. The method of claim 1, wherein the flying comprises sustained autorotative flight at an aircraft airspeed of at least 200 mph.

5. The method of claim 1, further comprising reducing, as a result of the reorienting, the at least one flapping load.

6. The method of claim 1, further comprising maintaining, as a result of the reorienting, the at least one flapping load at substantially zero.

7. The method of claim 1, wherein the reorienting comprises pivoting the mast with respect to the airframe about an axis extending laterally with respect to the airframe.

8. The method of claim 1, wherein the reorienting comprises pivoting the mast with respect to the airframe about an axis extending longitudinally with respect to the airframe.

9. The method of claim 1, wherein the rotor has a ratio of a first and lowest in plane natural frequency to a rate of rotor revolutions per minute that is greater than one.

10. The method of claim 1, wherein the airframe further comprises a fixed wing.

11. A method comprising:
obtaining a rotorcraft comprising
an airframe,
a rotor having an axis of rotation and being operably connected to rotate with respect to the airframe,
a mast extending to connect the rotor to the airframe,
a tilt mechanism connected to effect a change in orientation of the axis of rotation with respect to the airframe,
at least one sensor operably connected to detect a characteristic of the rotor, and
a computer system operably connected to the at least one sensor;
flying the rotorcraft in sustained autorotation;
identifying, by the computer system, (a) an impending crossing of a natural frequency of the rotor due to slowing of the rotor;
issuing in real time, by the computer system, in response to the identifying (a), a first command to the tilt mechanism; and
reorienting in real time, by the tilt mechanism, in response to the first command, the mast with respect to the airframe, such that the mast is tilted further forward than required to maintain the rotor in steady state autorotation;
slowing, due at least in part to the reorienting, the rotational speed of the rotor; and
crossing, subsequent to initiating the changing, the natural frequency of the rotor by slowing the rotor to below the natural frequency.

12. The method of claim 11, further comprising maintaining during the flying, as a result of the reorienting, the at least one flapping load at substantially zero.

13. The method of claim 12, wherein the rotor provides a value greater than one for a ratio of a first, in-plane, natural frequency to a rate of rotor revolutions per minute.

14. The method of claim 13, wherein the airframe further comprises at least one fixed wing.

15. The method of claim 14, wherein the flying further comprises supporting, by the at least one fixed wing, a majority of the weight of the rotorcraft.

16. The method of claim 15, wherein the reorienting comprises pivoting the mast with respect to the airframe about an axis extending laterally with respect to the airframe.

17. The method of claim 16, wherein the reorienting further comprises pivoting the mast with respect to the airframe about an axis extending longitudinally with respect to the airframe.

18. The method of claim 11, farther comprising:
identifying, by the computer system, (b) an impending crossing of a natural frequency of the rotor due to acceleration of the rotor;
issuing in real time, by the computer system, in response to the identifying (b), a second command to the tilt mechanism; and
reorienting in real time, by the tilt mechanism, in response to the second command, the mast with respect to the airframe, such that the mast is tilted further aft than required to maintain the rotor in steady state autorotation;
increasing, due at least in part to the reorienting, the rotational speed of the rotor; and
crossing, subsequent to initiating the changing, the natural frequency of the rotor by accelerating the rotor to above the natural frequency.

19. A rotorcraft comprising:
an airframe;
a rotor, having an axis of rotation and being operably connected to rotate with respect to the airframe;
a mast extending to connect the rotor to the airframe;
a tilt mechanism selectively reorienting the mast with respect to the airframe;
a computer system programmed to identify in flight impending crossings of natural frequencies of the rotor; and
the computer system, programmed further programmed to issue, in response to an identification of an impending crossing of a natural frequency of the rotor, the at least one command instructing the tilt mechanism to reorient the mast with respect to the airframe;
wherein the computer system is further programmed to:
identify that crossing of one of the natural frequencies of the rotor is not impending;
in response to identifying that crossing of one of the natural frequencies of the rotor is not impending, controlling tilt of the mast effective to achieve a desired lift to drag ratio according to an aeromechanical model of the rotorcraft.

20. The rotorcraft of claim 19, wherein the rotor provides a value greater than one for a ratio of a first and lowest, in-plane, natural frequency to a rate of rotor revolutions per minute.

* * * * *